Inventor:
Harold Nutt
By Edward C. Gritzbaugh
Atty.

Sept. 22, 1942.   H. NUTT   2,296,535
CLUTCH OPERATING MECHANISM
Filed Jan. 26, 1940   2 Sheets-Sheet 2
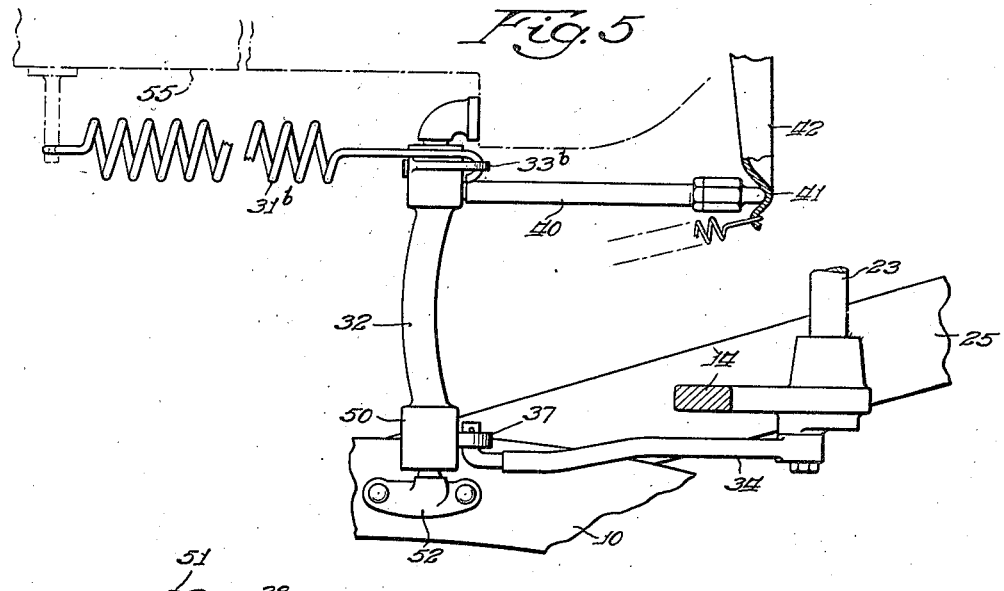
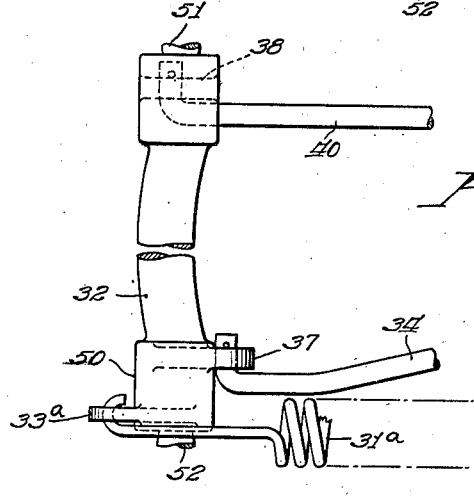
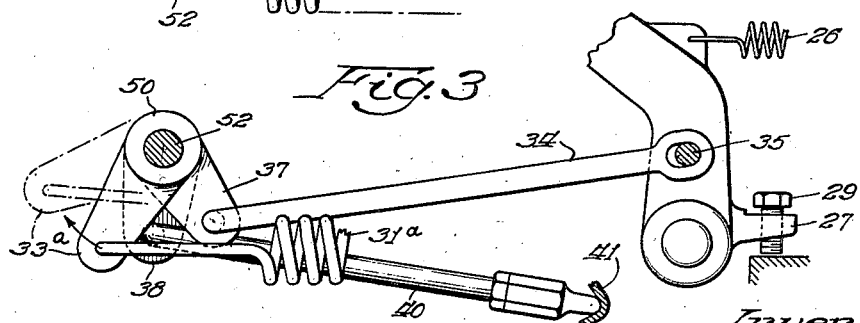
Inventor:
Harold Nutt
By Edward C. Gritzbaugh
Atty.

Patented Sept. 22, 1942

2,296,535

UNITED STATES PATENT OFFICE 2,296,535

CLUTCH OPERATING MECHANISM

Harold Nutt, Chicago, Ill., assignor to Borg-Warner Corporation, Chicago, Ill., a corporation of Illinois Application January 26, 1940, Serial No. 315,696

9 Claims. (Cl. 192—99)

My invention relates to clutch operating mechanism for operating a clutch of the type wherein engagement pressure is derived from a source exterior of the clutch.

An important object of the invention is to provide an arrangement of clutch packing spring and linkage for transmitting the pressure of such spring to the clutch, wherein the effective turning moment of the spring against the linkage decreases during clutch release, and wherein the linkage is arranged to transmit the opposing pressures of the clutch releasing device and the clutch packing spring, both mounted on the frame of a vehicle, to a clutch which is supported in cushioned mountings allowing relative movement between the clutch and frame, the linkage being adapted to accommodate such movement without interfering with the transmission of clutch releasing pressure.

Another object of the invention is to provide a clutch operated mechanism wherein the amount of pedal pressure required for holding the clutch in released position is reduced, as compared to conventional arrangements now available, through a combined reduction of the effective turning moment of the spring against the linkage and an increase in the effective turning moment applied to the linkage from the releasing device, as the latter is increasingly depressed.

The invention further aims to provide an arrangement of this type which is fairly compact and simple.

Other objects, the advantages and uses of the invention will become more apparent after reading the following specification and claims, and after consideration of the drawings forming a part of the specification, wherein:

Fig. 3 is a side elevation of a modified form of the invention.

Fig. 4 is a plan view of the same, and

Fig. 5 is a plan view of another modification of the invention.

Figure 1:
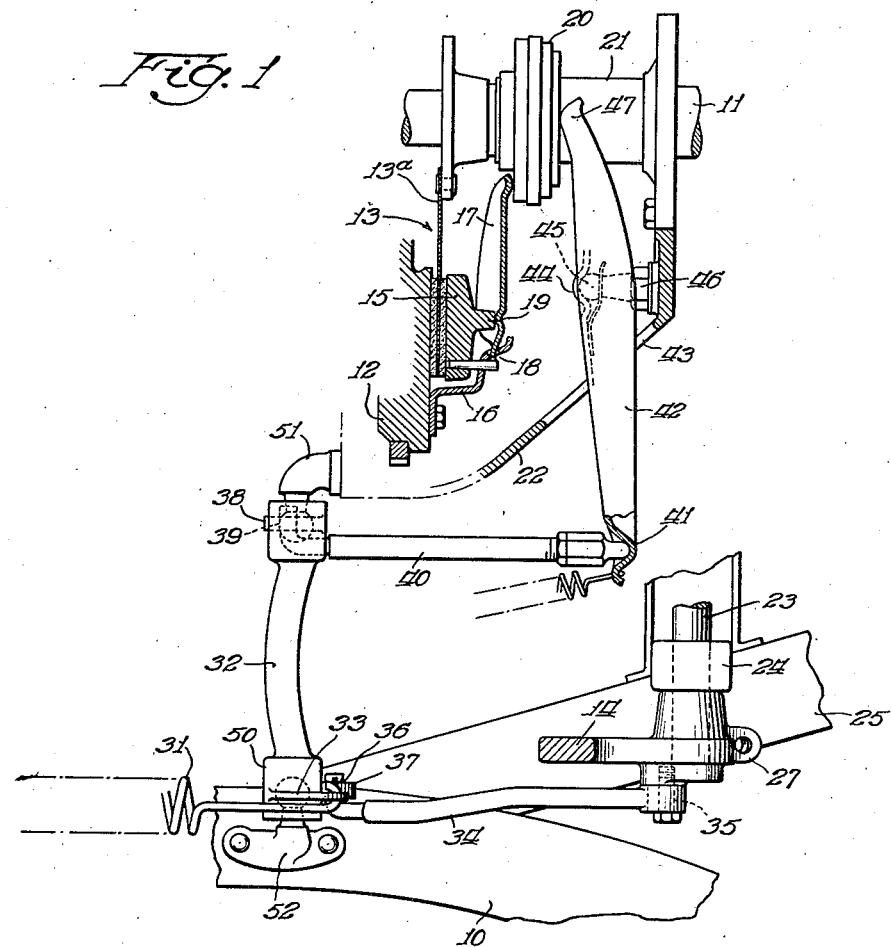
Fig. 1 is a plan view, partly in section, of a clutch operating mechanism embodying my invention, embodied in a motor vehicle.

As an example of one form in which the invention may be embodied, I have shown in the drawings portions of a motor vehicle including a frame 10 and a power plant and transmission unit, indicated generally at 55, which may be mounted upon conventional cushioned mountings (not shown) in the frame 10. A transmission shaft 11 is adapted to be connected to a driving member such as the fly-wheel 12 of the power plant, through the medium of a clutch 13, under the control of a clutch release pedal 14.

The clutch 13 may be of the type shown in my prior application Serial No. 284,606, filed July 15, 1939, now Patent No. 2,224,378, issued July 8, 1941. It includes the fly-wheel 12, a driven member 13a, a pressure plate 15, an annular fulcrum member 16 secured to the fly-wheel 12, and engagement levers 17 fulcrumed at their outer ends as at 18 in the fulcrum member 16, and having thrust transmitting association as at 19 with the pressure plate 15.

The inner ends of the levers 17 are adapted to receive thrust from a thrust bearing 20 slidably mounted on a sleeve 21 through which the driven shaft 11 extends. The sleeve 21 may form a portion of the housing 22 in which the clutch 13 is encased.

The pedal 14 may be mounted on a shaft 23 journalled in bearings 24 secured to a diagonal truss member 25 of the vehicle frame. A spring 26, attached to a lug 27 on the heel of the pedal through the medium of a hook 28 and a set screw 29, normally retains the pedal 14 in its retracted position, which is determined by the engagement of the set screw 29 against a stop 30 formed on the bracket 24. When the pedal 14 is in its retracted position, the clutch becomes engaged under pressure provided by an engagement spring 31. The pull of the spring 31 is transmitted to the clutch through linkage including a rock shaft 32 one end of which is provided with an upwardly and rearwardly extending arm 33 to which one end of the spring 31 is hooked. The other end of the spring may be hooked to the frame member 10.

The pull of the spring 31 may be neutralized by pressure applied to the rock shaft 32 from the pedal 14 through the medium of a push rod 34, one end of which has a lost motion thrust receiving connection with the pedal 14 as at 35, and the other end of which is pivoted at 36 to an arm 37 formed on the rock shaft 32 in substantially the same plane as the arm 33.

The other end of the rock shaft 32 is formed with a third arm 38 to which is pivoted, at 39, one end of a push rod 40. The other end of the push rod 40 is received in a socket 41 formed on the end of an operating lever 42.

The operating lever 42 is disposed in a substantially horizontal plane, and extends through an opening 43 in the clutch housing 22. The intermediate region of the lever 42 is formed with a socket 44 by means of which the lever is fulcrumed on the ball head 45 of a fulcrum post 46 mounted in the clutch housing 22. The inner end of the lever is in the form of a fork 47 which engages the thrust bearing 20 so as to transmit thrust thereto for effecting clutch engagement.

The respective ends of the rock shaft 32 are formed with sockets 49 and 50, which receive the ball heads of anchor posts 51 and 52 attached to the housing 22 and to the frame member 10 respectively.

Because of this universal connection with the frame and the clutch housing respectively, the rock shaft 32 will permit relative vertical movement between the clutch housing and the frame while transmitting torque from the arms 33 and 37 to the arm 38.

Figure 2:
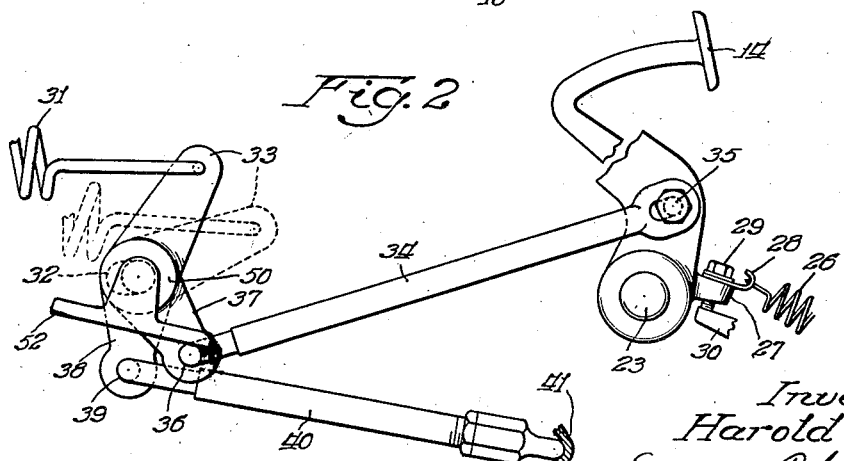
Fig. 2 is a side elevation of the same.

In the engaged position of the clutch, the arm 33 extends upwardly and rearwardly. When the clutch is disengaged, the arm 33 assumes the position shown in dotted lines in Fig. 2, extending rearwardly at an angle much more near the horizontal. Since the pull of the spring 31 is exerted in a substantially horizontal direction, the effective leverage of the arm 33 in the clutch disengaged position will be considerably less than in the engaged position. The arm 37, on the other hand, is arranged to project downwardly and rearwardly in the engaged position of the clutch, whereby the effective leverage of this arm will increase during clutch release. Thus, the opposition of the spring will gradually decrease while the effective leverage of the force applied through the pedal will gradually increase during clutch release, and the net result will be a very substantial decrease in pedal pressure at clutch disengaged position as compared to clutch engaged position. By combining the effects of increased leverage in the arm 37 and decreased leverage in the arm 33, it is possible to secure a greater reduction in pedal presure within the total angular travel available than would otherwise be possible.

The arm 38 is arranged to swing equally on both sides of a radius normal to the axis of the rod 40, so that its effective leverage remains substantially the same.

In the form of the invention shown in Figs. 3 and 4, the arm 33ª extends downwardy and the spring 31ª extends rearwardly, roughly parallel to the push rod 34. This arrangement has an advantage over that shown in Fig. 2, in that the reaction load of the spring against the anchor post 52 is largely cancelled by the load applied by the push rod 34. In other respects, this form of the invention is the same as the other, and the same reference characters are employed to designate the corresponding parts. In the form of the invention shown in Fig. 5, the lever 33ᵇ, instead of being at the outer end of the rock shaft 32 as shown in Fig. 1, is at the end of the shaft 32 adjacent the engine 55, and the forward end of the spring 31ᵇ is attached to the engine 55.

The invention provides an arrangement wherein the pedal may have a normal position just rearwardly of the clutch, wherein the operating lever 42 is accommodated below the shaft 23, and wherein the rock shaft is located at the forward extremity of the clutch. This arrangement is a compact one and yet permits of incorporation of the universally coupled torque transmitting connection between the pedal and spring on the one hand and the operating lever on the other.

While I have described my invention in connection with one specific embodiment thereof, it is to be understood that this is by way of illustration and not by way of limitation and the scope of my invention is defined solely by the appended claims, which should be construed as broadly as the prior art will permit.

I claim:

1. Mechanism for operating a friction clutch of a vehicle having a frame and a power plant and transmission unit of which the clutch forms a part, comprising a spring, external of the clutch, for providing clutch engaging force, a manually controlled device for releasing the clutch against the action of said spring, and a transverse rock shaft having universally pivotal connections at its respective ends with the frame and said unit respectively, said rock shaft having lever arms at its respective ends connected respectively to said spring, said releasing device, and the clutch, the arm to which said spring is connected being arranged so that its effective leverage decreases during clutch release.

2. An operating mechanism as defined in claim 1, wherein said rock shaft is provided at its end adjacent said unit with the pair of lever arms, said spring being attached at one end to one of said lever arms and at its other end to said unit, the other of said lever arms being operatively associated with the operating mechanism of the clutch, and a third lever arm at the other end of said rock shaft, operatively connected to said releasing device.

3. Operating mechanism as defined in claim 1, wherein said rock shaft is provided at its end that is associated with the frame, with downwardly extending lever means connected respectively to said spring and said releasing device, said spring extending rearwardly and being attached at its other end to the frame, and wherein the other end of said rock shaft is provided with a lever arm operatively associated with the operating mechanism of the clutch.

4. Mechanism for operating a friction clutch comprising a spring remote from the clutch for engaging the clutch, a manually controlled device for releasing the clutch against the action of said spring, and a rock shaft having a first arm against which said spring acts, a second arm against which said manually controlled device acts, and a third arm adapted to transmit to the clutch the resultant of the forces acting on said first and second arms, said first arm being arranged so that its effective leverage decreases during clutch release, and said second arm being arranged so that its effective leverage increases during at least a major portion of clutch releasing movement clutch.

5. For operating a clutch including a pressure plate, a plurality of engagement levers arranged to transmit pressure to the pressure plate, and a thrust bearing at the axis of the clutch for transmitting thrust to said levers; clutch operating mechanism comprising a spring, remote from the clutch, for providing clutch engagement pressure, a manually controlled device for neutralizing the action of said spring, so as to release the clutch, a rock shaft having a first arm against which said spring acts, a second arm against which said manually controlled device acts, and a third arm, an operating lever having one end associated with said bearing for transmitting thrust thereto and having its intermediate region fulcrumed on a fixed support, and a push rod pivoted to said third lever and in thrust transmitting association with the other end of said operating lever for transmitting thereto the resultant of the forces acting on said first and second arms, said first arm being arranged so that its effective leverage decreases throughout the clutch release.

6. In a vehicle including a frame member and a clutch adapted to be engaged by pressure from an external source, a clutch release pedal pivoted to the frame member, a housing in which said clutch is enclosed, a rock shaft extending transversely between said housing and the frame member and having, at its respective ends, universal pivotal connections with the housing and frame member respectively, said rock shaft being provided at one end with a pair of arms one of which is connected to said external source of pressure, a push rod connecting the other arm to said pedal, a third arm at the other end of said rock shaft, and means connecting said third arm to the clutch for transmitting engaging pressure thereto, said first arm being arranged so that its effective leverage decreases throughout the range of clutch release.

7. Mechanism for operating a friction clutch of a vehicle having a frame and a power plant and transmission unit of which the clutch forms a part, comprising a spring, external of the clutch, for providing clutch engaging force, a manually controlled device for releasing the clutch against the action of said spring, and a transverse rock shaft having universally pivotal connections at its respective ends with the frame and said unit respectively, said rock shaft having its end that is associated with the frame formed with two lever arms, said spring being attached at one end to one of said lever arms and at its other end to the frame, a push rod connecting the other of said lever arms to the releasing device, and a third lever arm on the other end of said rock shaft, operatively connected to the operating mechanism of the clutch, the arm to which said spring is connected being arranged so that its effective leverage decreases during clutch release.

8. In a vehicle including a frame member and a clutch adapted to be engaged by pressure from an external source, a housing in which said clutch is enclosed, a rock shaft extending transversely between said housing and the frame member and having, at its respective ends, universal pivotal connections with the housing and frame member respectively, a clutch release pedal pivoted to the frame member rearwardly of said rock shaft, a tension spring extending forwardly from said rock shaft and constituting said external force of pressure, said rock shaft being provided at one end with an arm extending upwardly and rearwardly and connected to the rear end of said spring, said rock shaft having at the same end a second arm extending downwardly and rearwardly when the clutch is disengaged, a push rod connecting said second arm to said pedal, a third arm at the other end of said rock shaft, extending downwardly, and means connecting said third arm to the clutch for transmitting engaging pressure thereto, said first arm being arranged so that its effective leverage decreases throughout the range of clutch release.

9. In a vehicle including a frame member and a clutch adapted to be engaged by pressure from an external source, a clutch release pedal pivoted to the frame member, a housing in which said clutch is enclosed, an operating lever extending partially into and partially out of said housing, fulcrumed intermediate its ends upon the housing, operatively associated with the clutch at its inner ends, and disposed transversely and substantially horizontally, a rock shaft disposed forwardly of the clutch and forwardly of said release pedal, said rock shaft extending transversely between said housing and the frame member and having at its respective ends, universal pivotal connections with the housing and frame member respectively, a tension spring extending forwardly from the rock shaft and constituting said external source of pressure, said rock shaft being provided at one end with a pair of arms, one of which is connected to the forward end of said spring, a push rod connecting the other of said pair of arms to said pedal, a third arm at the other end of said rock shaft, and a push rod pivoted at one end to said third arm and at its other end having a thrust transmitting association with said operating lever, the first mentioned arm being arranged so that its effective leverage decreases throughout the range of clutch release.

HAROLD NUTT.